US012084312B2

(12) United States Patent
Yuksel et al.

(10) Patent No.: US 12,084,312 B2
(45) Date of Patent: Sep. 10, 2024

(54) SYSTEMS AND METHODS FOR VARIABLE SPEED MODULAR MOVING WALKWAYS

(71) Applicant: Beltways Inc., Cincinnati, OH (US)

(72) Inventors: Edip Yuksel, Cincinnati, OH (US); Matine Yuksel, Cincinnati, OH (US); Yahya John Yuksel, Cincinnati, OH (US)

(73) Assignee: Beltways Inc., Cincinnati, OH (US)

( * ) Notice: Subject to any disclaimer, the term of this patent is extended or adjusted under 35 U.S.C. 154(b) by 0 days.

(21) Appl. No.: 18/386,451

(22) Filed: Nov. 2, 2023

(65) Prior Publication Data

US 2024/0059528 A1 Feb. 22, 2024

Related U.S. Application Data

(63) Continuation of application No. 18/216,360, filed on Jun. 29, 2023, now Pat. No. 11,912,532, which is a continuation-in-part of application No. 17/568,494, filed on Jan. 4, 2022, now Pat. No. 11,530,115.

(60) Provisional application No. 63/133,713, filed on Jan. 4, 2021.

(51) Int. Cl.

*B66B 21/12* (2006.01)
*B66B 25/00* (2006.01)
*B66B 27/00* (2006.01)

(52) U.S. Cl.

CPC .............. *B66B 21/12* (2013.01); *B66B 25/00* (2013.01); *B66B 25/003* (2013.01); *B66B 27/00* (2013.01)

(58) Field of Classification Search

CPC ......... B66B 21/12; B66B 25/00; B66B 27/00; B66B 25/003

USPC .......................................................... 198/322

See application file for complete search history.

(56) References Cited

U.S. PATENT DOCUMENTS 4,232,776 A * 11/1980 Dean ....................... B66B 23/26 198/791

2018/0002143 A1* 1/2018 Matheisl .................. G07C 3/00

FOREIGN PATENT DOCUMENTS

WO 2016/074997 * 5/2016 ............. B66B 25/00

* cited by examiner

*Primary Examiner* — James R Bidwell

(74) *Attorney, Agent, or Firm* — Hall Estill Law Firm

(57) ABSTRACT

A moving walkway transit system having a moving walkway and a beltway control system for monitoring and controlling various operational aspects of the moving walkway. A method of using the beltway control system to operate and monitor the moving walkway.

18 Claims, 11 Drawing Sheets

FIG. 12

SYSTEMS AND METHODS FOR VARIABLE SPEED MODULAR MOVING WALKWAYS

CROSS-REFERENCE TO RELATED APPLICATIONS

The present application is a continuation application of U.S. patent application Ser. No. 18/216,360, filed Jun. 29, 2023, which is a continuation-in-part application of U.S. patent application Ser. No. 17/568,494, filed Jan. 4, 2022, now U.S. Pat. No. 11,530,115, which claims the benefit under 35 U.S.C. § 119(e) of U.S. Provisional Application No. 63/133,713, filed Jan. 4, 2021, entitled "SYSTEMS AND METHODS FOR VARIABLE SPEED MODULAR MOVING WALWAYS [sic]", which is hereby expressly incorporated herein in its entirety.

FIELD OF EMBODIMENTS OF THE INVENTION

Embodiments of the present invention relate to modular moving walkways which can accelerate to move people and items at speeds higher than a walking speed and decelerate to a walking speed at an egress point.

SUMMARY OF EMBODIMENTS OF THE INVENTION

Embodiments of the present invention provide a pitless and modular belt-type accelerating moving walkway transit system (hereafter referred to as "Beltway") with a connected chain of interchangeable and substantially identical modules that allow for the acceleration and deceleration of passengers. Each module is embedded with sensors, software and other technologies to facilitate connecting and exchanging data using, for example, module-to-module handshaking to monitor module speed differentials, energy-saving start, and safe shutdown upon impact.

The Beltway includes a series of interchangeable belt-type modules that allows pedestrians to move, for example, through cities and large venues at speeds up to and greater than 7 m/s, which is approximately 10 times the speed of known conventional walkways. Embodiments of the Beltway can move 7,500, or more, people per hour, and efficiently and cost effectively enhance connectivity of existing public transit hubs and large venues to surrounding areas. In an embodiment, the modules connect atop the ground, without the need for the industry standard 1-meter pit running the length of the floor.

Improving upon accelerating moving walkway technology, embodiments of the Beltway can provide fast, easy, and safe mobility 24/7. Energy consumption can be augmented by the installation of solar energy gathering technology.

BRIEF DESCRIPTION OF EMBODIMENTS OF THE INVENTION

Figure 1:
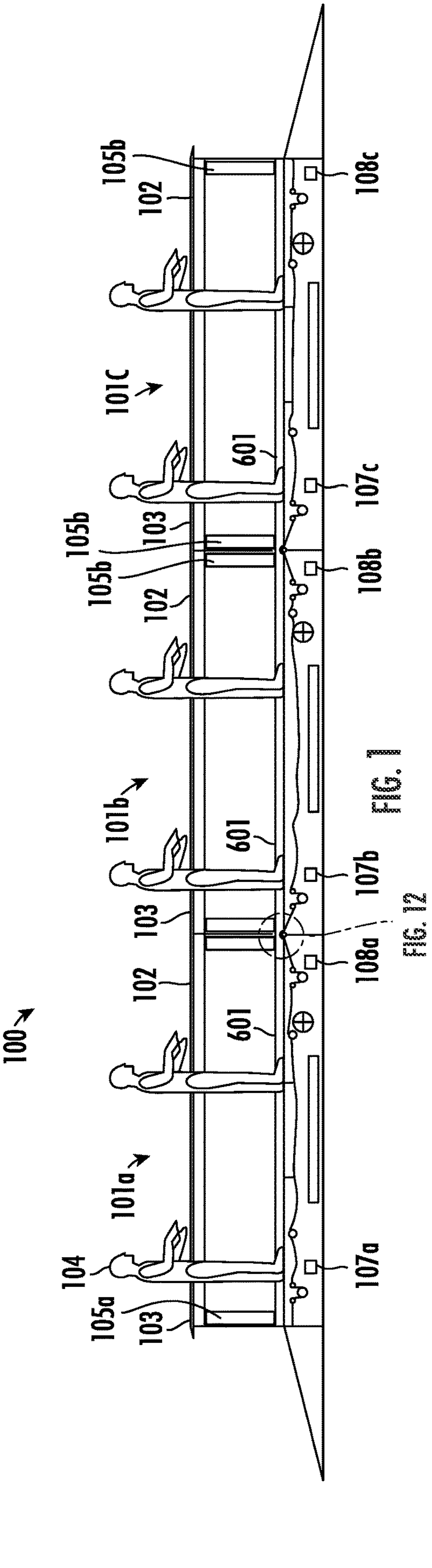
FIG. 1 is a side view of three exemplary walkway modules.

FIG. 1, generally at 100, is a side view of a pitless and modular belt-type accelerating moving walkway transit system (Beltway) that, for purposes of illustration, includes three substantially identical pitless walkway modules 101*a-c* that are leveled and positioned atop a surface such as the ground, floor, road or deck. While modules 101*a-c* are shown for simplicity, it should be understood that there can also be four or more modules, generally represented as 101*a-n*. Generally, a single module 101 can be used alone, as well as in combination with one or more additional modules. The modules 101 can be any size such that the desired Beltway 100 is produced. In another embodiment, the Beltway 100 could include more than a single sized module 101. For example, the Beltway 100 could include 25 modules 101 that have a first size and 25 modules that have a second size.

Figure 5:
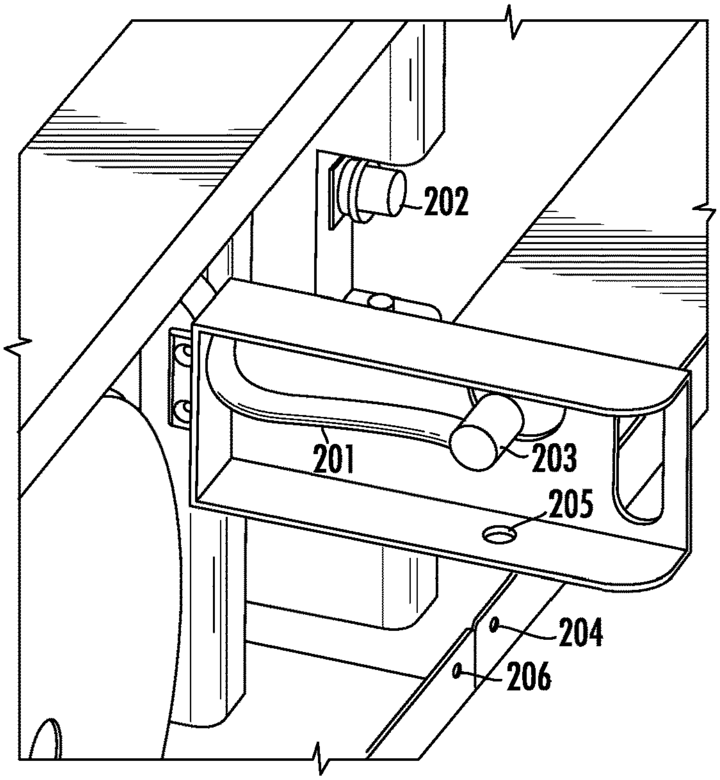
FIG. 5 is a partial perspective view of a module-to-module electromechanical connector in an unconnected position.
Figure 13:
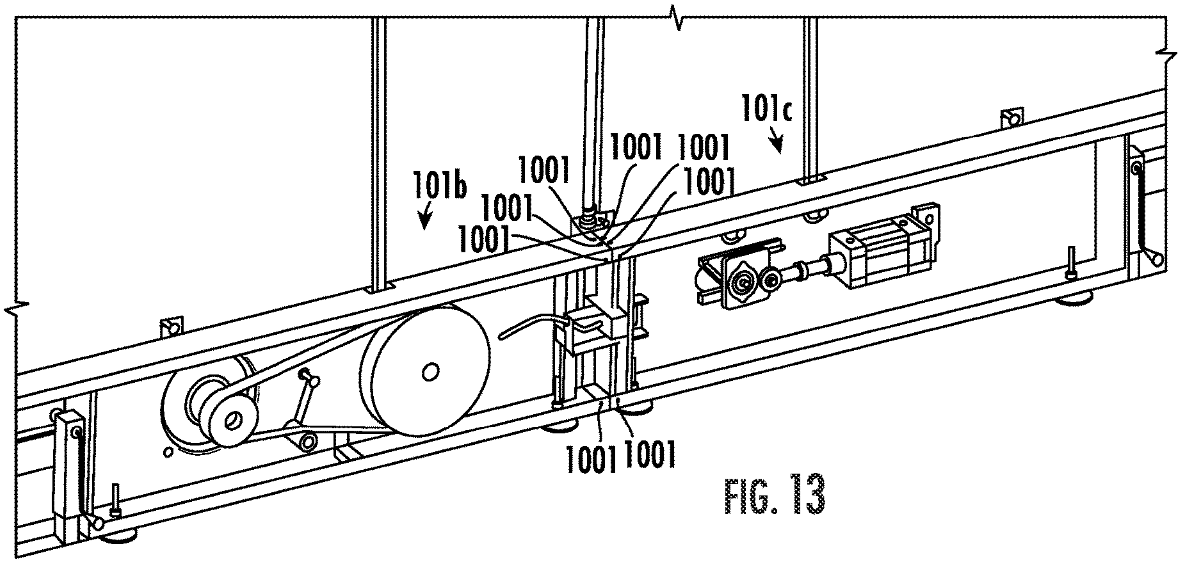
FIG. 13 is a perspective view of a lower handrail gear configuration.

Each module 101*a-c* includes an endless belt 601 (FIG. 9) and a handrail 102 moving at a respectively different or same speed from the other modules 101 in the Beltway 100. Each module 101*a-n* has its own handrail 102*a-n*, respectively, that is independent of any other module's handrail 102. At least immediately linearly adjacent modules (such as 101*a-c*) are connected electrically by a cable 201 (as shown in FIG. 5) and communicate electronically the speed and state of connected modules. Radio waves can also be used to communicate the speed and state between one module and one or more other modules 101*a-c*. Immediately adjacent modules (such as 101*a-c*) are adjoined physically by a fastener such as at least one of a latch, a magnet and a bolt 1001 (FIG. 13). The endless belt 601 can be driven by any type of motor 106, or motors, and any other components known in the art for making moving walkways operational. Similarly, the handrail 102 can be driven by any type of motor known by one of ordinary skill in the art capable of moving each handrail 102 for each module 101. In one exemplary embodiment, the handrail 102 and the belt 601 can be driven by a motorized pulley.

Each module 101*a-n* can include at least one motion sensor 105 to determine when a person or object has entered or exited each module 101. In one embodiment, each module 101 can include a motion sensor 105 on each end of each module 101 to be able to determine when a person gets on each module 101, when a person gets off each module 101, or where a person is on the Beltway 100 when multiple modules 100*a-n* are used. The motion sensors 105 can be used to activate one or more of the modules 101*a-n*, track flow of passengers, detect falls and the like. Each module 101*a-n* can also include a belt sensor 107*a-n* (or sensors) to monitor belt alignment, belt tension, belt speed and the health of the belt. Each module 101*a-n* can also include a motor sensor 108*a-n* (or sensors) for monitoring speed, temperature, vibration, and noise of the motor 105 of each module 101. It should be understood and appreciated that the sensors 105, 107, and/or 108 can be a single sensor or multiple sensors.

If a fall is detected by any of the motion sensors 105, the beltway control system 111 can shut down the belts 601 of certain modules 101 depending on their proximity to the sensor 105 that detected the fall. The belts 601 of the modules 101 can be gradually shut down at any desirable rate or immediately stopped. For example, the beltway control system 111 may shut down the belts 601 of all the modules 101 in the Beltway 100 or it may only shut down the belts 601 of the modules immediately adjacent to the detected fall. In another embodiment, the beltway control system 111 can shut down all the belts 601 immediately adjacent to the detected fall and all the modules 101 in the Beltway 100 that lead up to the detected fall. Depending upon how the beltway control system 111 is set up, the beltway control system 111 can slow the belts 601 of some modules 101 of the Beltway 100, gradually stop the belts 601 of some modules 101 of the Beltway 100, or immediately stop the belts 601 of some modules 101 of the Beltway 100.

Figure 2:
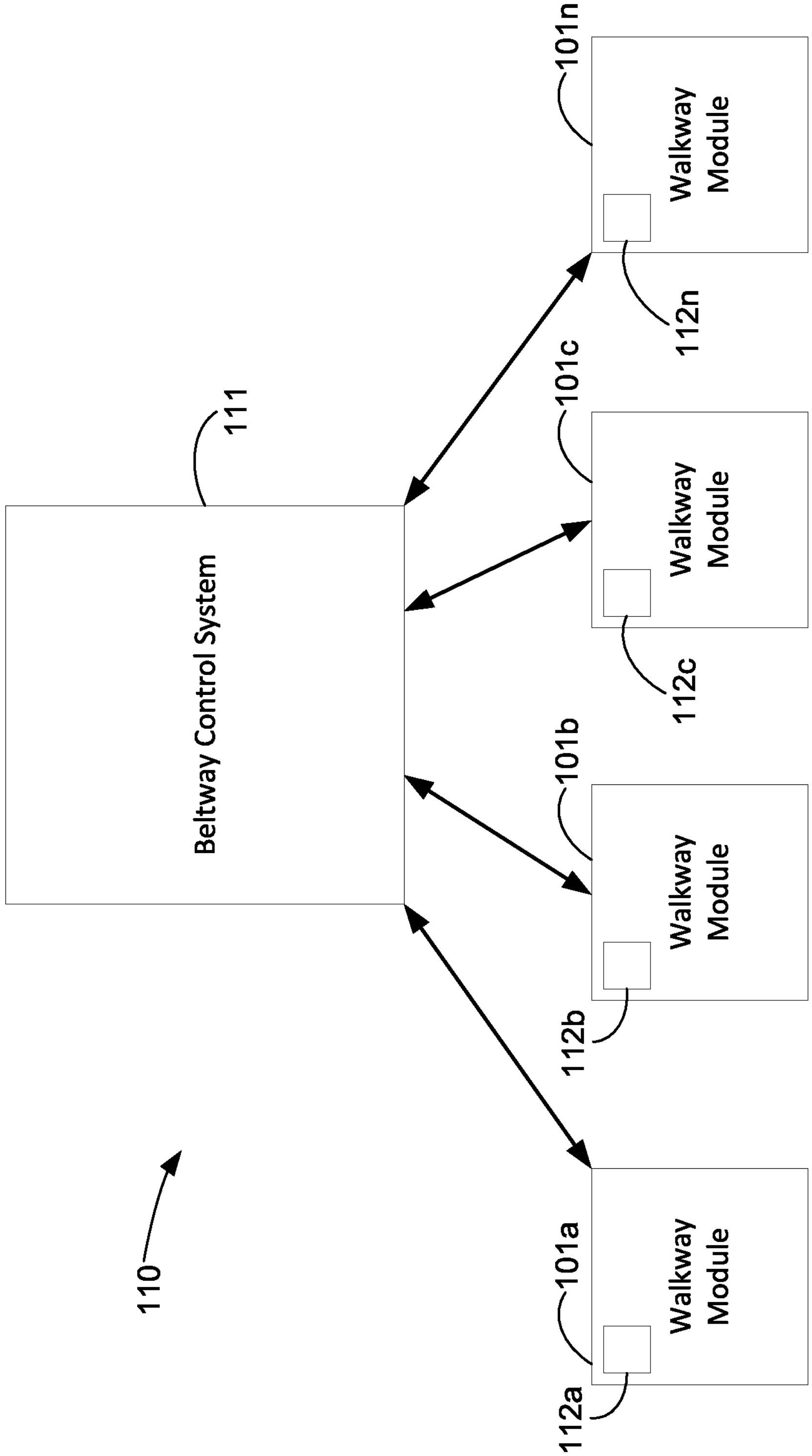
FIG. 2 is a schematic view of a Beltway system constructed in accordance with the present disclosure.

Referring now to FIG. 2, shown therein is a beltway operating system (BOS) 110. The BOS 110 can include a beltway control system 111 for facilitating the operations of the BOS 110. The beltway control system 111 is configured to send and receive data to and from at least one walkway module controller 112 associated with a module 101, or multiple walkway module controllers 112*a-n* associated with multiple modules 101*a-n*. The beltway control system 111 is also configured to carry out all operations of the BOS 110 described herein. Each walkway module controller 112 is the system that controls the operational aspects of each module 101. Operational aspects of each module 101 include, but are not limited to, power application (on or off), belt speed of each module 101, audio indicators, visual indicators, handrail speed of each module 101, motion activation, etc.

Each walkway module controller 112 can receive information from each sensor 105, 107, and/or 108 for each module 101 and send that information to the beltway control system 111. The Beltway 100 could be set up where the information from each sensor 105, 107, and/or 108 can be sent directly to the beltway control system 111 and bypass the respective walkway module controller 112 for that specific module 101. The beltway control system 111 can alter the operation of any of the modules 101*a-n* of the Beltway 100 based on the information received from the sensors 105, 107, and/or 108 and/or each walkway module controller 112.

Figure 3:
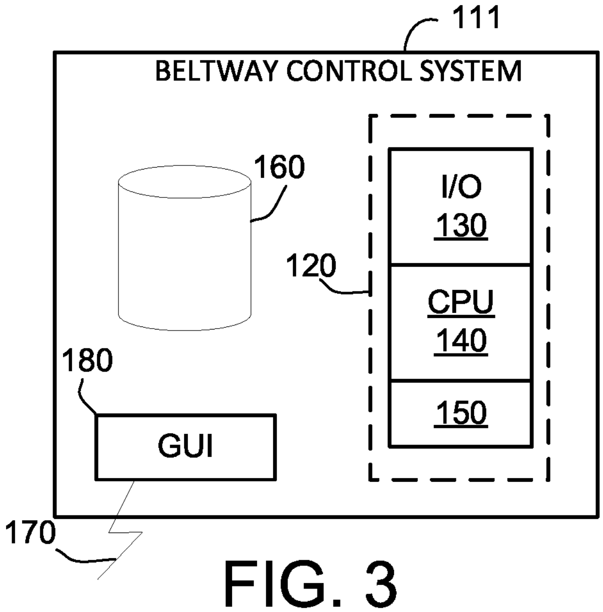
FIG. 3 is a schematic view of a beltway control system constructed in accordance with the present disclosure.

Referring now to FIG. 3 shown therein is a diagram of the beltway control system 111. The beltway control system 111 is capable of executing a computer program product embodied in a tangible processor-readable storage medium to execute a computer process. Data and program files may be input into the beltway control system 111, which reads the files and executes the programs therein using one or more processors. Some of the elements of the beltway control system 111 are shown in FIG. 3, wherein a processor 120 is shown having an input/output (I/O) section 130, a Central Processing Unit (CPU) 140, and a memory section 150. There may be one or more processors 120, such that the processor 120 of the beltway control system 111 comprises a single central-processing unit 140, or a plurality of processing units. The processors may be single-core or multi-core processors. The beltway control system 111 may be a conventional computer, a distributed computer, or any other type of computer. The described technology is optionally implemented in software loaded in memory 150, a disc storage unit 160, and/or communicated via a wired or wireless network link 170 on a carrier signal (e.g., Ethernet, 3G wireless, 1G wireless, LTE (Long Term Evolution), 5G) thereby transforming the beltway control system 111 in FIG. 3 to a special purpose machine for implementing the described operations.

The I/O section 130 may be connected to one or more user-interface devices (e.g., a keyboard, a touch-screen display unit, etc.) or a disc storage unit 160. Computer program products containing mechanisms to effectuate the systems and methods in accordance with the described technology may reside in the memory section 150 or on the storage unit 160 of the beltway control system 111.

The beltway control system 111 can also include a communication interface 180 capable of connecting the beltway control system 111 to an enterprise network via the network link 170, through which the beltway control system 111 can receive instructions and data embodied in a carrier wave. When used in a local area networking (LAN) environment, the beltway control system 111 is connected (by wired connection or wirelessly) to a local network through the communication interface 180, which is one type of communications device. When used in a wide-area-networking (WAN) environment, the beltway control system 111 typically includes a modem, a network adapter, or any other type of communications device for establishing communications over the wide-area network. In a networked environment, program modules depicted relative to the beltway control system 111 or portions thereof may be stored in a remote memory storage device. It is appreciated that the network connections shown are examples of communications devices for and other means of establishing a communications link between the computers may be used.

In an example implementation, a browser application, a compatibility engine applying one or more compatibility criteria, and other modules or programs may be embodied by instructions stored in memory 150 and/or the storage unit 160 and executed by the processor 120. Further, local computing systems, remote data sources and/or services, and other associated logic represent firmware, hardware, and/or software, which may be configured to operate the Beltway 100, and each module 101*a-n* included in the Beltway 100. The beltway control system 111 of the BOS 110 may be implemented using a general purpose computer and specialized software (such as a server executing service software), a special purpose computing system and specialized software (such as a mobile device or network appliance executing service software), or other computing configurations. In addition, user requests, profiles and parameter data, agent profiles and parameter data, location data, parameter matching data, and other data may be stored in the memory 150 and/or the storage unit 160 and executed by the processor 120.

Figure 4:
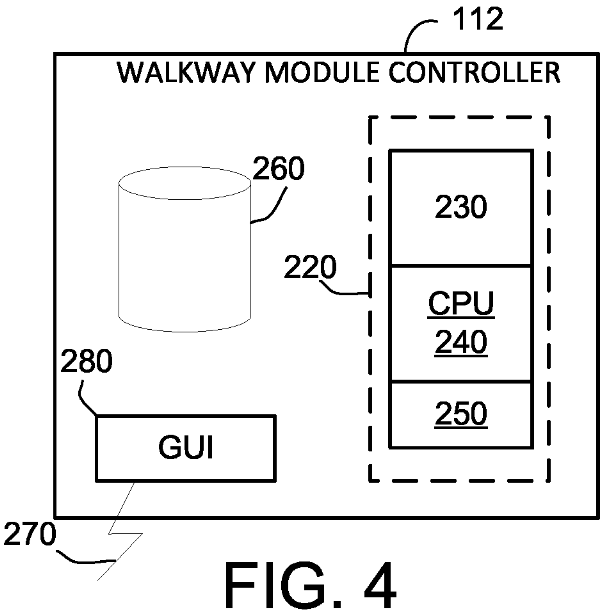
FIG. 4 is a schematic view of a walkway module controller constructed in accordance with the present disclosure.

Referring now to FIG. 4 shown therein is a diagram of each walkway module controller 112. Each walkway module controller 112 is capable of executing a computer program product embodied in a tangible processor-readable storage medium to execute a computer process. Data and program files may be input into each walkway module controller 112, which reads the files and executes the programs therein using one or more processors. Some of the elements of each walkway module controller 112 are shown in FIG. 4, wherein a processor 220 is shown having an input/output (I/O) section 230, a Central Processing Unit (CPU) 240, and a memory section 250. There may be one or more processors 220, such that the processor 220 of each walkway module controller 112 comprises a single central-processing unit 240, or a plurality of processing units. The processors may be single-core or multi-core processors. Each walkway module controller 112 may be a conventional computer, a distributed computer, or any other type of computer. The described technology is optionally implemented in software loaded in memory 250, a disc storage unit 260, and/or communicated via a wired or wireless network link 270 on a carrier signal (e.g., Ethernet, 3G wireless, 1G wireless, LTE (Long Term Evolution), 5G) thereby transforming each walkway module controller 112 in FIG. 4 to a special purpose machine for implementing the described operations.

The I/O section 230 may be connected to one or more user-interface devices (e.g., a keyboard, a touch-screen display unit, etc.) or a disc storage unit 260. Computer program products containing mechanisms to effectuate the systems and methods in accordance with the described technology may reside in the memory section 250 or on the storage unit 260 of each walkway module controller 112.

Each walkway module controller 112 can also include a communication interface 280 capable of connecting each walkway module controller 112 to an enterprise network via the network link 270, through which each walkway module controller 112 can receive instructions and data embodied in a carrier wave. When used in a local area networking (LAN) environment, each walkway module controller 112 is connected (by wired connection or wirelessly) to a local network through the communication interface 280, which is one type of communications device. When used in a wide-area-networking (WAN) environment, each walkway module controller 112 typically includes a modem, a network adapter, or any other type of communications device for establishing communications over the wide-area network. In a networked environment, program modules depicted relative to each walkway module controller 112 or portions thereof may be stored in a remote memory storage device. It is appreciated that the network connections shown are examples of communications devices for and other means of establishing a communications link between the computers may be used.

In an example implementation, a browser application, a compatibility engine applying one or more compatibility criteria, and other modules or programs may be embodied by instructions stored in memory 250 and/or the storage unit 260 and executed by the processor 220. Further, local computing systems, remote data sources and/or services, and other associated logic represent firmware, hardware, and/or software, which may be configured to operate each module 101*a-n* in the Beltway 100. Each walkway module controller 112 may be implemented using a general purpose computer and specialized software (such as a server executing service software), a special purpose computing system and specialized software (such as a mobile device or network appliance executing service software), or other computing configurations. In addition, user requests, profiles and parameter data, agent profiles and parameter data, location data, parameter matching data, and other data may be stored in the memory 250 and/or the storage unit 260 and executed by the processor 220.

The embodiments of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term “memory” (e.g., memory 150 and/or 250) means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term “memory” or “storage medium” expressly does not include a transitory medium, such as a carrier signal, but the computer instructions can be transferred to the memory wirelessly.

Figure 6:
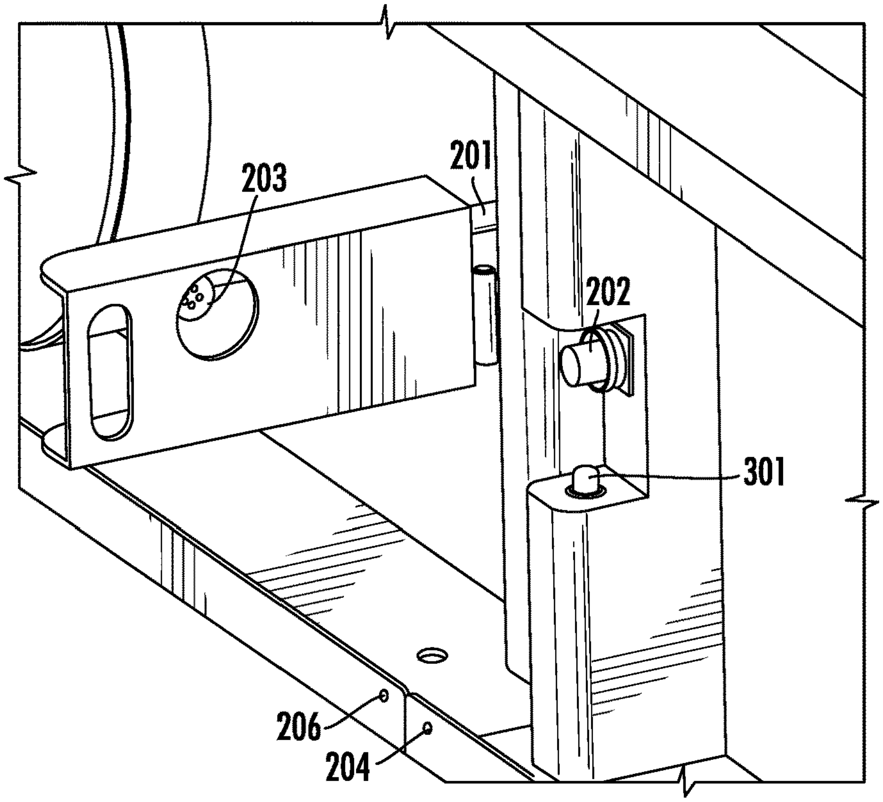
FIG. 6 is a second partial perspective view of a module-to-module electromechanical connector in an unconnected position.
Figure 7:
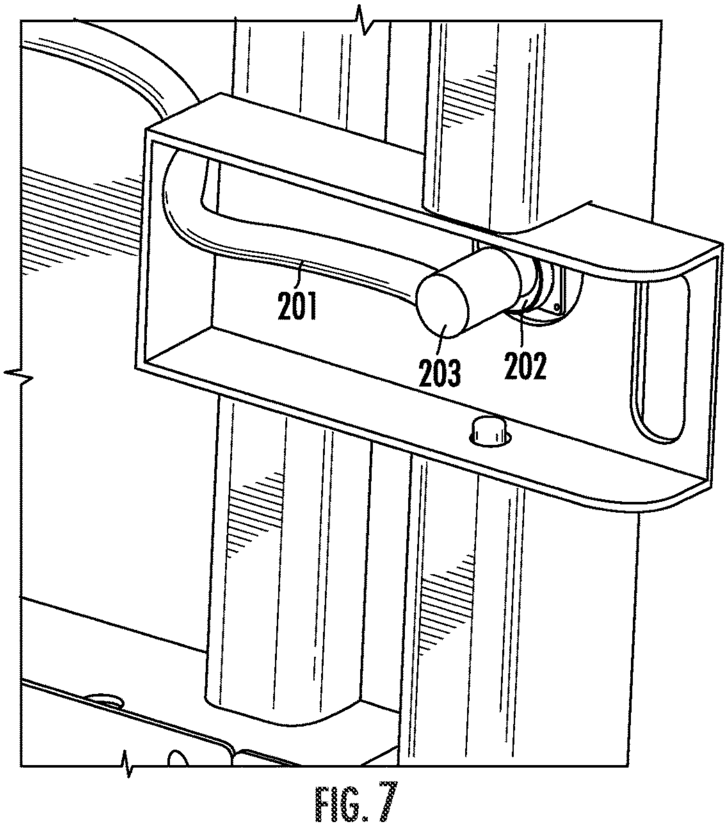
FIG. 7 is a partial perspective view of a module-to-module electromechanical connector in a connected position.

As shown in FIGS. 5-7, cables 201 can use a male/female connector 202/203 to supply power to an electric motor (not shown) that drives the endless belt 601 and handrail 102 of each module 101*a-c* at the same speed, in a synchronized manner. This allows multiple modules 101*a-c* to connect in a chain to form the system 100.

The power source is electricity which is connected to the electrical grid and a first active module (e.g., module 101*b*, module 101*c* or, in the more general embodiment, module 101*n*). Solar photovoltaic panels on top of the structure (not shown) covering the Beltway, in the case of outdoor applications, can be used to supplement the energy. An exemplary AC cable (not shown) that can be used to provide electricity can have a National Electrical Manufacturers Association (NEMA) 5-15-P power connector that plugs into a standard 110 VAC wall outlet and a NEMA 5-15-R receptacle that plugs into a first active module (e.g., module 101*n*). In certain embodiments, the modules may require 460 VAC, 3-phase, 60 Hz power supply. For outdoor applications, energy from solar cells will pass through a photovoltaic inverter that is operably connected to the AC power line (not shown). Generally, the AC power line and cables 201 together provide electricity for the lighting, electric motor(s), and related devices such as AC drive of the modules 101*a-n*.

Cables 201 can be operably connected to receive power from the AC power line, and can use a male/female connector 202/203 to supply power to an electric motor (not shown) that drives the endless belt 601 and a motor that drives the handrail 102 of each module 101*a-n* at the same speed, in a synchronized manner. This allows multiple modules 101*a-n* to connect in a chain to form the system 100. Power can also be supplied to the modules 101 via a busway of power cables disposed underneath the Beltway 100.

Modules 101*a-n*, at or proximate its entrance side 103 (as determined by passenger 104 direction), will have, for example, a motion sensor 105 that can detect passengers. However, the first module 101*a* and/or last module 101*n*, can remain idle and be used as a spare module that can replace another module 101*b-m* (where m is less than n) that becomes inoperative. When module 101*a* (and/or module 101*n*) is used as a spare, when its motion sensor 105 detects a passenger 104, it will activate the belt 601 of at least one adjacent module 101*b* (rather than the belt 601 of module 101*a*). Similarly, when module 101*n* is used as a spare, it will activate the belt 601 of at least one adjacent module 101*m* (rather than the belt 601 of module 101*n*).

In addition, the motion sensor 105*a* of module 101*a* can also be used to activate the belt 601 of module 101*a* when module 101*a* replaces a module 101*b-m* that may become inoperative. It should be understood that motion sensors can be photoelectric motion sensors, which can be reflective-type photoelectric sensors or thru-beam type sensors. In addition, other motion sensor technologies can be utilized, such as combined photoelectric and microwave motion sensor switches, or microwave sensor switches.

In an embodiment, each module 101*a-n* is configured, such as by programming, to change the direction of the belt 601, provided that no passenger 104 is on the belt 601 of any module 101*a-n*. Without passengers 104 on any module 101*a-n*, modules 101*a-n* will be inactive and motionless, and the direction of the belt 601 of any, or all, of the modules 101*a-n* can be reversed. For example, the direction of the belt 601 can be reversed to accommodate passenger 104 demand during morning or evening rush hour.

However, when the sensors 105, positioned at or proximate the entrance side 103 of the first inactive module 101*a*, detect a passenger 104, such detection will trigger movement of the belt 601 and handrail 102 of module 101*b*, and also trigger movement of the belt 601 and handrail 102 of one or more adjacent modules (e.g., one or more of modules 101*c-n*), depending on the velocity of the passenger 104. Generally, modules 101*b-m* can be activated such that there can be at least one active module (with a moving belt 601 and handrail 102) in front of any passenger(s) 104 and at least one active module behind any passenger 104 who stands (or walks) on an active module (101*c-n*).

As previously stated herein, the Beltway 100 can have any number of modules 101*a-n* to create a moving walkway of a desired length. In one embodiment, all of the modules 101 in the Beltway 100 can be the same speed. In other embodiments, the modules 101 can have varied speeds depending on their position in the Beltway 100. Typically, when three or more modules 101 are used in the Beltway 100, there is an initial module, at least one full speed module and an end module. The initial module can have an initial speed that makes transition to the Beltway 100 easier. The at least one full speed module can have any desired top speed such that a safe transition from the initial module to the full speed module is accomplished. The end module can be any end speed such that safe transition can be accomplished by a user when exiting the Beltway 100. The end speed and initial speed can different speeds or be the same speed depending upon the desired setup of the Beltway 100.

In certain embodiments, the Beltway 100 can include at least five modules. In these embodiments, the Beltway 100 can include an initial module 101, an accelerating module 101, a full speed module, a decelerating module and an end module. The speed of the accelerating module and the speed of the decelerating module is greater than the speed of the initial module and the end module, respectively, but less than the speed of the full speed module. The inclusion of the accelerating and decelerating modules permits the Beltway 100 to achieve higher top speeds, lower initial speeds, and lower end speeds than traditional moving walkways because they provide a transition speed between the initial speed and the full speed and the end speed and the full speed. It should be understood and appreciated that all of these modules are the same just being operated at varying speeds. It should also be understood that the Beltway 100 can include any number of full speed modules depending upon the length of each module and the length of the desired Beltway 100.

In a further embodiment, the Beltway 100 can include multiple accelerating modules positioned between the initial module and the full speed module(s) and multiple decelerating modules positioned between the full speed module(s) and the end module. The multiple accelerating and decelerating modules permits the Beltway 100 to achieve an even higher full speed. In an exemplary embodiment, the Beltway 100 can have a first accelerating module and a second accelerating module. The first accelerating module positioned adjacent to the initial module has a higher speed than the initial module and a lower speed than the second accelerating module positioned adjacent to the first accelerating module on the opposite side of the initial module. The second accelerating module positioned between the first accelerating module and the full speed module has a higher speed than the first accelerating module and a lower speed than the full speed module(s). The full speed module is positioned between the second accelerating module on one side and the first decelerating module on the other side. The first decelerating module has a speed lower than the full speed module and higher than a first decelerating module positioned on the opposite side of the second decelerating module from the full speed module. The first decelerating module has a speed lower than the second decelerating module and higher than the end module positioned on the opposite side of the first decelerating module from the second decelerating module. The number of accelerating and decelerating modules incorporated into the Beltway 100 can vary depending upon the length of the Beltway 100, the top speed desired, the entry and exit speeds desired, and the desired speed differential between modules operating at different speeds.

Modules 101*a-n* can also include a visual medium (not shown) for providing color-coded visual cues that correspond to the speed of each module, wherein the color-coded visual cues can be in the order of a rainbow, or some other color spectrum, thereby preparing passengers to anticipate and adapt to the change of the speed of each module 101*a-n*. The visual medium could also be dimmed or brightened to provide the visual cue that corresponds to the speed of each module 101.

Modules 101*a-n* can also include a speaker for providing audio information, instruction, alerts, or cues via music with varying tempo that corresponds to the speed of at least one module 101*a-n*, thereby preparing passengers to anticipate and adapt to the change of the linear speed of the belt 601 of any module 101*a-n*.

FIG. 5 is a partial perspective view of a module-to-module electromechanical male/female connector 202/203 in an unconnected position. Each module 101*a-n* includes, for example, a mechanical fastener such as spring-loaded plunger 301 (FIG. 6) and aperture 205 to establish and secure an electrical connection. Optionally, a magnetic latch (not shown) can be used in addition to or in lieu of a mechanical fastener. There are also apertures 204, 206 for nuts and bolts, screws and so forth to connect and secure or fasten linearly adjacent the modules 101 to each other with, for example, a steel plate (not shown).

FIG. 6 is a second partial perspective view of a module-to-module electromechanical male/female connector 202/203 in an unconnected position. Each module 101*a-n* wirelessly, or via a wired connection, communicates its state to a control center (not shown) which, in turn, controls and regulates the belt 601 speed differential of modules 101*a-n*, such that the system self-regulates acceleration/deceleration and comes to a gradual halt if any of the modules become nonoperational. In an embodiment, the control center can be a smart IoT control system. FIG. 7 is a partial perspective view of an electromechanical male/female connector 202/203 in a connected position.

Figure 8:
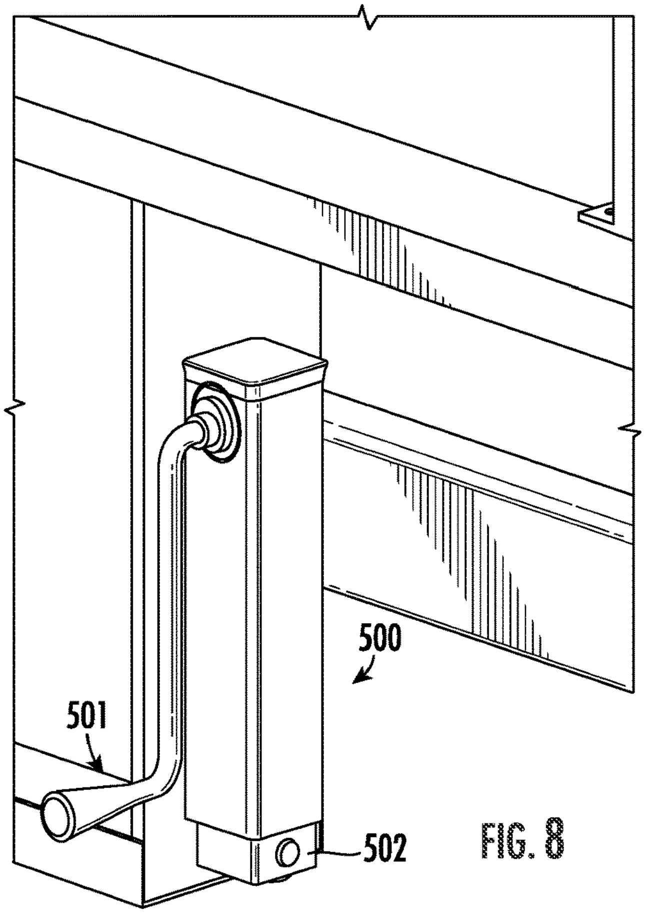
FIG. 8 is a perspective view showing an adjustable leveling foot of a walkway module.

FIG. 8 is a perspective view showing an adjustable leveling foot 500 of a module 101*a-n*. The handle 501 can be rotated in one direction (e.g., clockwise) to extend telescoping arm 502, and be rotated in the opposite direction (e.g., counterclockwise) to retract the telescoping arm 502.

Figure 9:
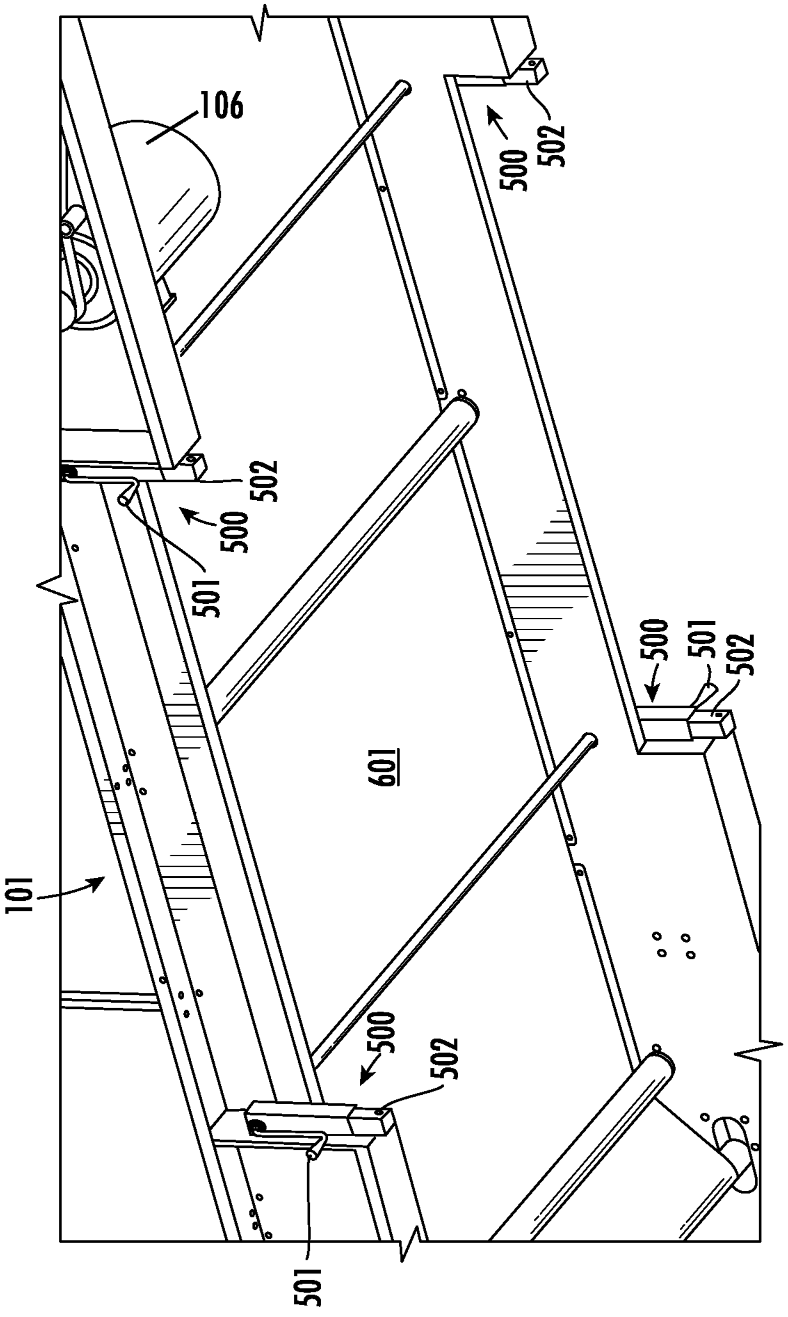
FIG. 9 is a perspective view showing four adjustable leveling feet of a walkway module.

FIG. 9 is a perspective view showing four adjustable leveling feet 500 of a walkway module 101. The four adjustable feet 500 of each module 101*a-n* can be individually raised and lowered to place the belt 601 of each module 101*a-n* in substantial horizontal alignment. Thus, the belt 601 of any individual module 101*a-n* is horizontally aligned, and the belt 601 of all individual modules 101*a-n* are collectively in substantial horizontal alignment. In an embodiment, an automated alignment system can also be provided and utilized in lieu of adjustable leveling feet 500.

The modules 101*a*, 101*b* are configured to permit the removal and replacement of belts 601 by opening the side door (not shown) of the encasing mount, and loosening the tension in the belt and sliding the belt out from over the walking platform and under the motor shafts, without the disassembling or dismantling of the module's mechanical components. In an embodiment, belts 601 may include thin layers of rubber reinforced with high tensile strength fibers, such as para-aramid material.

Figure 10:
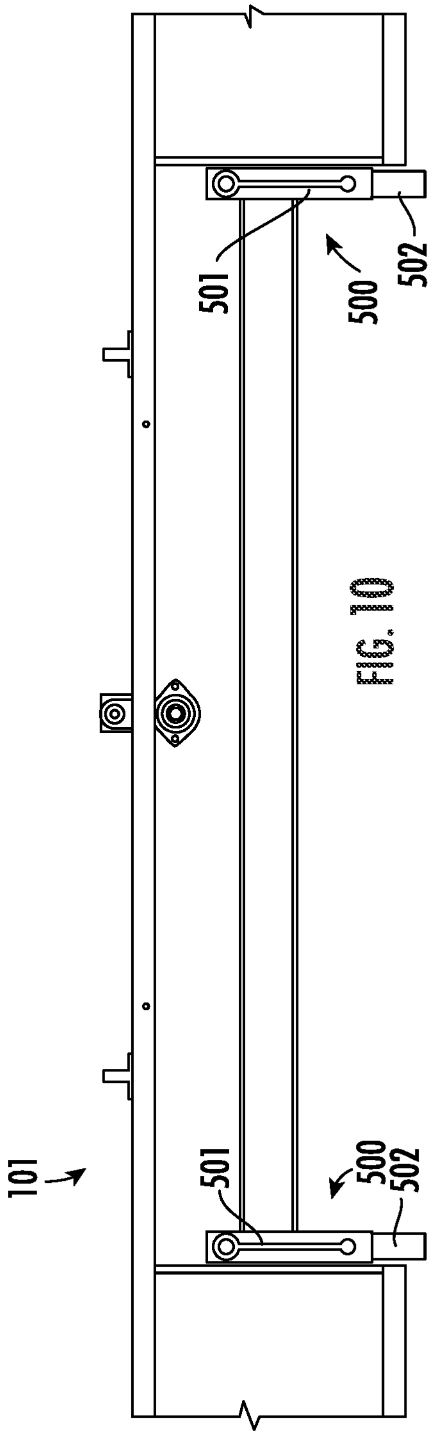
FIG. 10 is a side view showing two adjustable leveling feet of a walkway module.

FIG. 10 is a side view showing two adjustable leveling feet 500 of a portion of a module 101.

Figure 11:
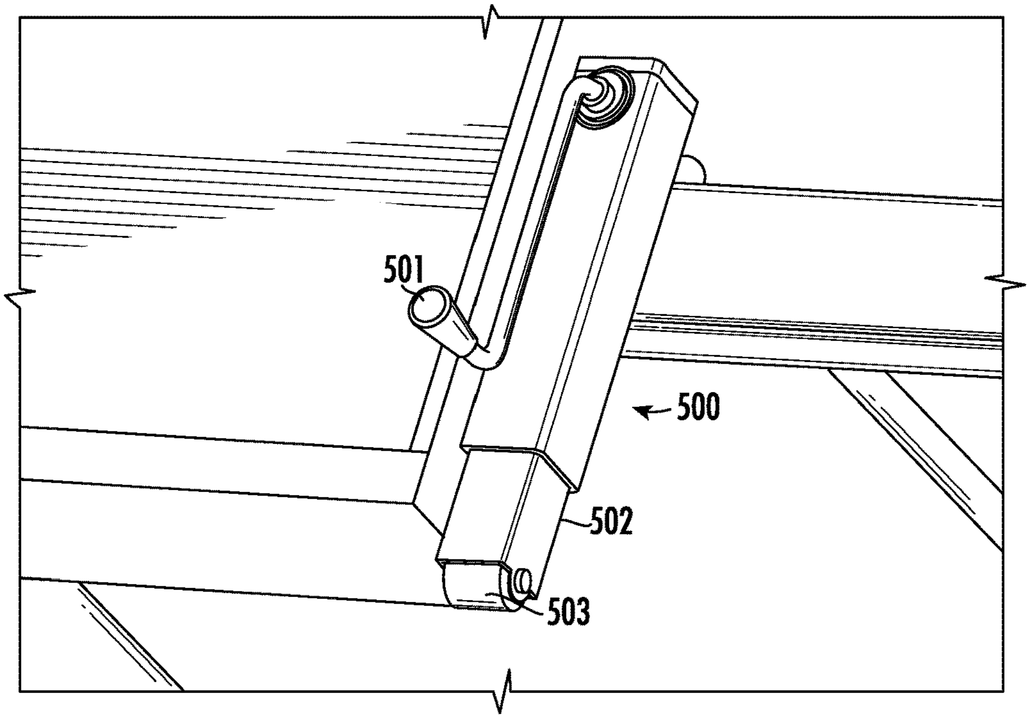
FIG. 11 is a perspective view showing retractable wheels on an adjustable leveling foot.

FIG. 11 is a perspective view showing retractable wheels 503 on an adjustable leveling foot 500. Each module 101*a-n* can have retractable wheels 503 to facilitate replacing a module 101*b-m* that becomes inoperative with the first module 101*a* and/or last module 101*n*, as described above.

Figure 12:
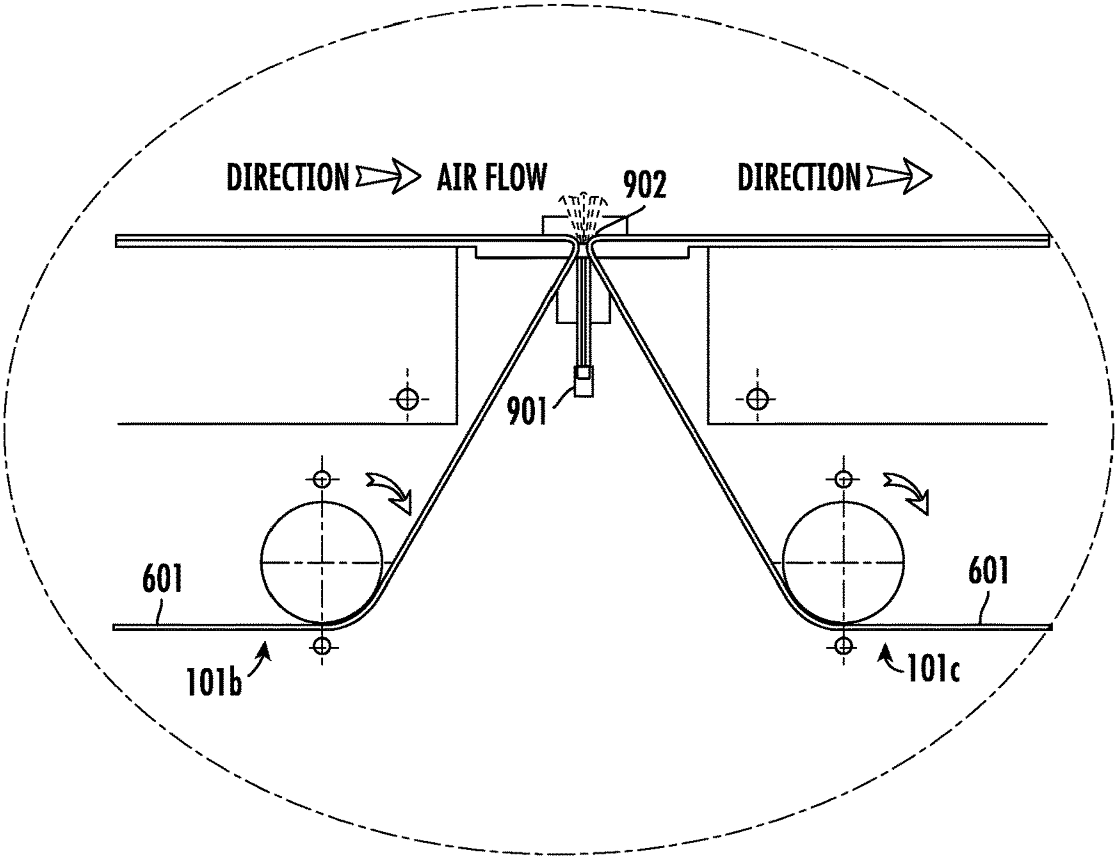
FIG. 12 is a side view showing an air knife between two walkway modules.

FIG. 12 is a side view showing an air knife 901 between two walkway modules 101*b*, 101*c*. Air knife 901 provides a powerful air draft passing upwardly from beneath the lower portion of belt 601 and through any space 902 between the belts 601 of the respective modules 101*b*, 101*c*. The air draft prevents debris from approaching or accumulating in the space 902, and facilitates removal of any accumulated debris that may accumulate in space 902. The air knife may also provide air conditioning. Each module 101 can also include a gap sensor 903 for monitoring the space 902 (transit gap) between the belts 601 of adjacent modules 101. The beltway control system 111 can shut down any, or all, of the modules 101 if the gap sensor 903 detects something in the transit gap for a predetermined amount of time. The gap sensor 903 can be any type of sensor known in the art capable of performing the functions described herein, such as photoelectric or reflex array sensors.

FIG. 13 is a perspective view of a lower handrail gear configuration.

Figure 14:
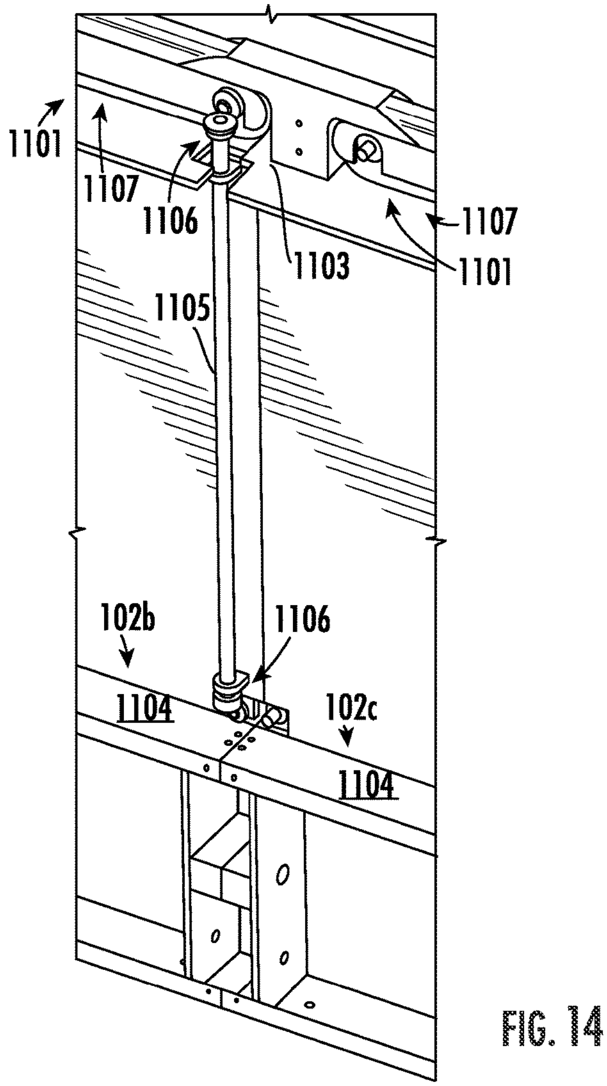
FIG. 14 is a perspective view of an upper handrail gear configuration.

FIG. 14 is a perspective view of an upper handrail gear configuration 1106. Each module 101*b*, 101*c* includes handrails on opposing sides of the belt 601 (not shown). In FIG. 14, a single handrail 1101 is shown for each module 101*b*, 101*c*.

The handrails 1101 of each module 101*b*, 101*c* are fastened to each side by inserting them within the "u-channel" (not shown) in the base of the frame 1104, and secured with latches and bolts (not shown). Handrails of adjacent modules can be connected via any means known in the art. One example is a T-shaped connector 1103, which covers the gap between the handrails 1101 of adjacent modules 101*b*, 101*c*.

The handrails 1101 move in synchrony with the belt 601 (not shown) of its respective module 101*b*, 101*c* via a mechanical connection, such as an arrangement of shafts 1105 and gears 1106, which are operably connected to the motor (not shown) driving the belt 601 of the respective module 101*b*, 101*c*. In addition, handrails 1101 can be disinfected by devices such as ultraviolet-c lamps and lights (not shown) placed proximate the underside 1107 of the handrails 1101.

Figure 15:
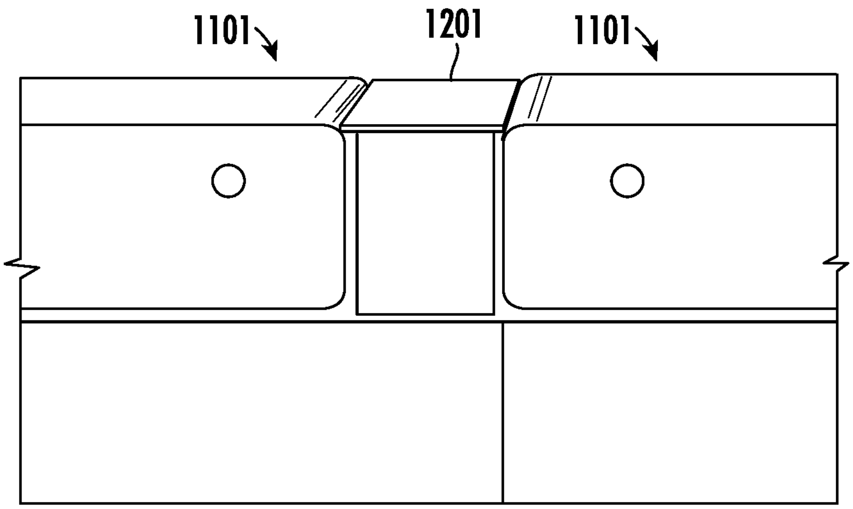
FIG. 15 is a perspective view of a first embodiment of a handrail connection.

FIG. 15 is a perspective view of a first embodiment of a handrail connection. This embodiment of the depressed handrail connection 1201 may provide more safety since it is not flush with the two adjacent handrails 1101, and reduces the fixed portion of the handrail.

Figure 16:
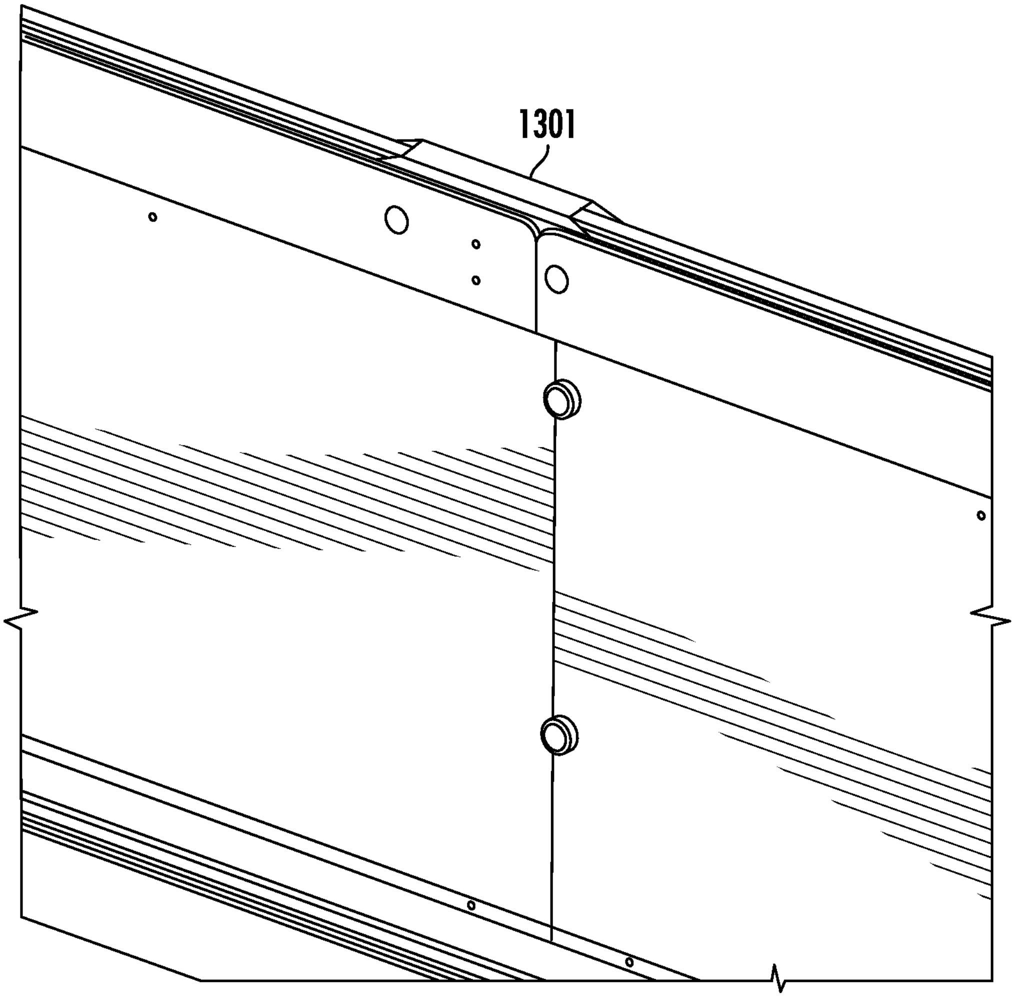
FIG. 16 is a perspective view of a second embodiment of a handrail connection.

FIG. 16 is a perspective view of a second embodiment of a handrail connection, showing the embodiment of FIG. 14 with a cover plate 1301.

Figure 17:
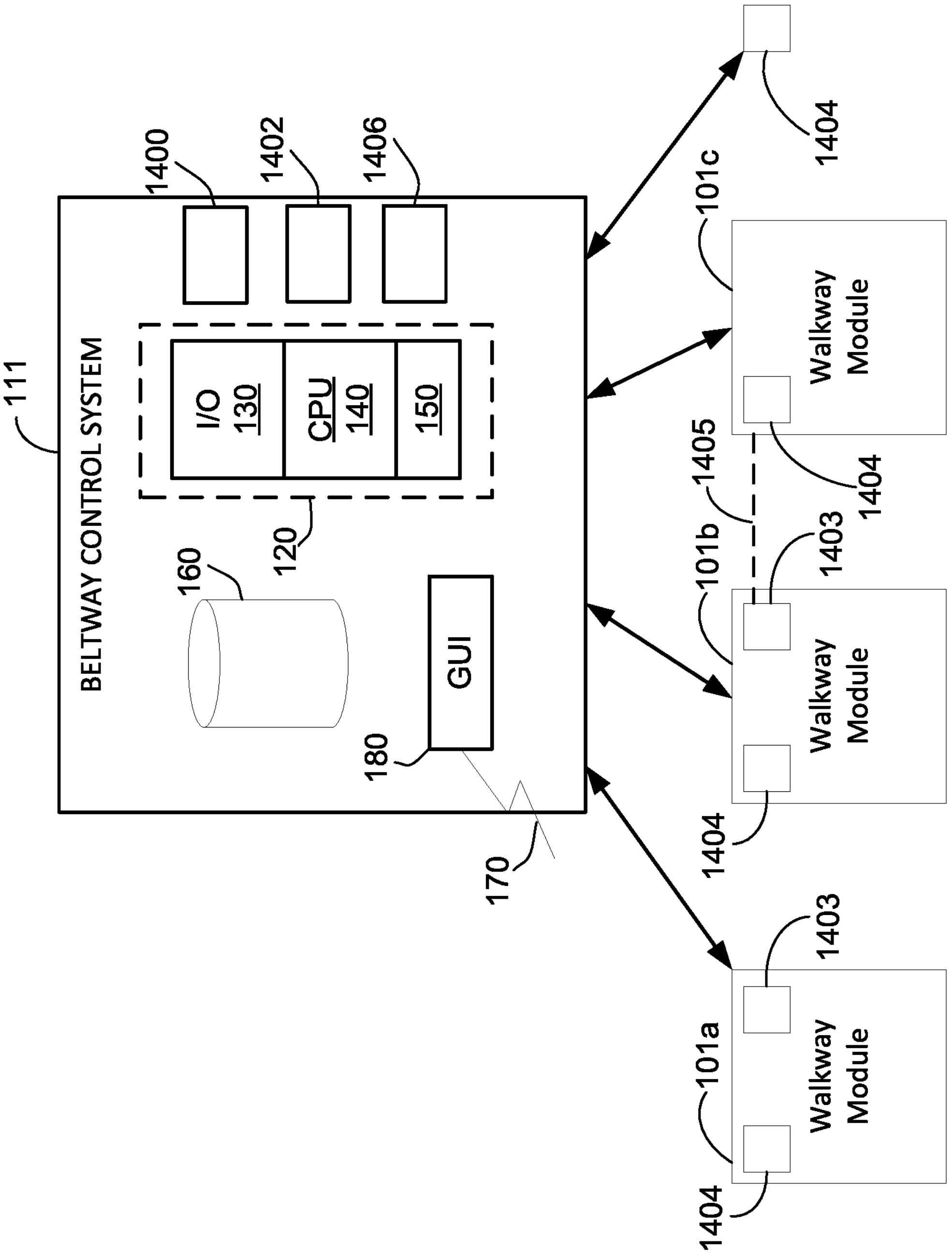
FIG. 17 is a schematic view of another embodiment of a beltway control system constructed in accordance with the present disclosure.

The present disclosure is also directed towards various operating capabilities of the beltway control system 111 for the beltway 100, or for any type of moving walkway, such as pitless moving walkways, modular moving walkways, belt-type moving walkways, accelerating moving walkways, or any combination thereof. Referring now to FIG. 17, the beltway control system 111 can include an AC bus bar 1400 (or multiple AC bus bars) to receive electrical power from a power source (e.g., a city's electrical grid, solar panels, generators, batteries, etc.) and distribute the electrical power to the beltway 100. The moving walkway can be powered by multiple power sources and the beltway control system 111 can include multiple AC bus bars 1400 to receive and distribute the electrical power from the power sources.

In another embodiment of the present disclosure, when the moving walkway is a variable speed modular moving walkway, the beltway control system 111 can include a DC bus bar 1402 (or multiple DC bus bars) for capturing and disseminating energy created by a module 101 of the moving walkway under certain situations. The DC bus bar 1402 can be electrically connected to a motor 106 of a module 101. In certain situations where power is reduced or shut off to the moving walkway, the motor 106 could continue to be turned by a particular module 101. In this case, energy/power can be generated and this power/energy can be captured, transferred or stored by the DC bus bar 1402. The energy/power produced in this manner could be directed to power other functions of the moving walkway and the power could be stored in a battery 1403, or some other similar energy storage system.

The beltway control system 111 can also manage various speed profiles for the moving walkway. The speed profiles can vary depending upon preferences of the operator of the moving walkway. Therefore, customized speed profiles can be generated for the moving walkway via the beltway control system 111. The speed profile could be a single speed for all the modules 101 of the moving walkway. The speed profile could have a different speed for every module 101 included in the moving walkway. The moving walkway could have separate speed profiles having different top speeds, different speeds for the initial modules 101 and ending modules 101. One speed profile can include at least three modules 101 of the moving walkway operating at three different speeds.

The beltway control system 111 can also be set up to automatically adjust the speeds of the modules 101 of the moving walkway, or the motion profile of the moving walkway, based on the demographics of the passengers using the moving walkway or approaching the moving walkway. Adjusting the speeds of the modules 101 of the moving walkway can affect the deceleration and acceleration of the moving walkway. Data gathering devices 1404 can be used with the beltway control system 111 to gather and provide information to the beltway control system 111 about the demographics of the passengers riding the moving walkway. The data gathering devices can communicate with the beltway control system via a wired or wireless connection. The demographics can be the walking speed of the passengers, the number of passengers, whether passengers are using any type of walking aids, etc. Other demographics that can be determined by the data gathering devices 1404 includes, but are not limited to, age of passengers, gaits of passengers, anthropometry of passengers, mobility impairments, etc. The data gathering devices 1404 can be positioned at various locations on the moving walkway and/or on structures that are around the moving walkway so that accurate passenger demographics can be determined and sent to the beltway control system 111.

Based upon the information gathered by the data gathering devices 1404, the speed of the modules 101 of the moving walkway can be adjusted up or down. For example, the speed of the moving walkway can be higher if the walking speeds of the passengers approaching the moving walkway are higher. The speed of the moving walkway might be lower if the speed of the passengers approaching the moving walkway is lower. Further, the speed of the moving walkway could be higher if the volume of passengers approaching the moving walkway is lower. In one embodiment, the speed of the beltway is adjusted based on the slowest passenger approaching the moving walkway. The speed of modules 101 of the moving walkway can be adjusted to be slower until the slowest measured passenger is off the moving walkway. The speed of the modules 101 could then be programmed to speed back up once the slowest measured passenger is determined to be off the moving walkway.

The data gathering devices 1404 can be any type of device that can capture useable demographic information on the passengers using or about to use the moving walkway. The data gathering devices 1404 could be computer vision cameras, photo-eye sensors, thermal sensors, safety curtains, or equivalent sensors. The beltway control system 111 can include a machine learning system 1406 that can be trained using data from extensive passenger tests and during ongoing public use to enable the machine learning system 1406 to accurately identify key passenger attributes/demographics.

The beltway control system 111 can also be set up to limit access to the moving walkway to only authorized passengers. A gate mechanism could be implemented to prevent access to the moving walkway. Thus, only authorized passengers would be permitted to pass the gate mechanism and use the moving walkway. The data gathering devices 1404 can be used by the beltway control system 111 to identify a person's face (facial recognition), a person's unique gait, a person's unique anthropometry, or some other unique identifier. In one example, access to the moving walkway may be by subscription or ticketed passengers only and the beltway control system 111 restricts access to the moving walkway accordingly. The moving walkway can also incorporate a scanner for reading unique access codes, such as a QR code, for permitting access to passengers to the moving walkway.

The data gathering devices 1404 can also be used to monitor the gap or space 902 between the belts 601 of adjacent modules 101 and detect when a passenger has fallen or is falling on the moving walkway. The data gathering devices 1404 can also be used to determine if a passenger has fallen after exiting the moving walkway, which could affect the passengers still on the moving walkway. The moving walkway can be shut down by the beltway control system 111 if something is detected in the space 902 for a certain amount of time, or if a fallen passenger has been detected. The beltway control system 111 could also initiate a safety shutdown if it is determined that a passenger has left the moving walkway via some other means than the end of the moving walkway, such as by jumping over the side. The moving walkway could also be shut down by a person who is remotely monitoring the moving walkway.

The beltway control system 111 can also collect and store operational information about the moving walkway, such as speed profiles, passenger activity and flow, passenger safety, energy usage, component health and safety, etc. The collected information can be provided to operators of the moving walkway and/or the customers via an API integration wherein the operational information is downloaded onto the customer and/or operator's system. The collected and stored information about the moving walkway can be reported in real-time via a virtual replica of the beltway 110, commonly referred to as a digital twin. The digital twin can appear to operators and/or customers as a visual, tabular, graphical, and/or other representation of the moving walkway in the virtual setting of the actual installation environment, simulating in real-time passenger flow, energy usage, etc. A user of the online monitoring system can also select a given module 101 of the moving walkway in a customer location to examine additional details related to its performance and health, including total miles in operation, total miles in operation since last serviced, maintenance history, upcoming maintenance activities, system health, energy usage, alerts, etc. To focus user attention to critical areas, the digital twin can overlay additional graphics such as a heat map that reports the actual temperature of each module 101, or a symbolic heat map that shows relative system health according to predefined metrics.

The beltway control system 111 can also be used to track/monitor various aspects of the moving walkway to reduce downtime and duration of maintenance activities. A common pain point experienced by customers of moving walkways is the frequency of system downtime and the duration of maintenance activities. A multi-faceted solution to this problem is required, for which reliable information plays a critical role. The type of information that is important pertains to the health of the moving walkway and its components, the maintenance history of the system, and the recommended maintenance schedule for the moving walkway according to component lifecycle data and other factors.

Maintenance activities can be bucketed in two broad categories: planned and unplanned. Generally speaking, it is best to address a system issue before it causes a breakdown or other detrimental outcome. Planned maintenance activities help prevent major issues from occurring because the maintenance schedule is built according to the upkeep requirements of all the components in the moving walkway, such as when they need to be replaced or repaired. Unfortunately, the real world introduces many variables that cause components to not always comply with expectations, and thus maintenance is sometimes required ahead of schedule—otherwise known as unplanned maintenance.

Unplanned maintenance that comes as a total surprise tends to lead to long system downtimes, because, for example, a small issue develops into a major one, a replacement component requires a long lead-time, etc. Therefore, leveraging the data gathering devices 1404 to monitor the moving walkway health and performance is paramount to addressing problems early and minimizing downtime. The data gathering devices 1404 be used to measure physical characteristics of the moving walkway in real time and trigger alerts to the beltway control system 111 if the measurements far exceed the norm. If the deviations are sufficiently extreme and persistent, the beltway control system 111 can temporarily shut down the moving walkway and trigger an alert that the moving walkway accessible to operators and/or customers that an issue requires attention.

The data gathering devices 1404 that can be used for monitoring various components of the moving walkway include, but are not limited to, the following: sensors to measure vibration, noise, shock, and temperature levels for tracking the performance and health of the drive system, including the motor and drives; photo-eye sensors to detect treadway belt misalignment; computer vision cameras or equivalent sensors to detect belt fraying, tearing, defects, etc.; proximity sensors between modules to monitor the gap; encoders or equivalent sensors to measure treadway belt speed. The information from all these devices becomes significant over time, and a way of organizing it into the proper subsystem becomes necessary. Whether for a single-body or modular moving walkway, or a single-body or modular accelerating walkway, radio frequency identification (RFID) tags or equivalent asset tracking technology can be a means of storing, reading, and changing data related to the performance and health of the moving walkway. Each module 101 could have its own RFID tag to store all the data from the data gathering devices 1404 for that particular module 101. Each RFID tag can be in communication with the beltway control system 111.

As the number of modules 101 and/or moving walkways continue to grow in the field, locating the units becomes increasingly necessary. Attaching a Global Positioning System (GPS) device on each module 101 and/or moving walkway allows every unit to be tracked during delivery, install, operation, maintenance, etc. The GPS identifier can be tied to the RFID tag identifier, making maintenance operations traceable and efficient.

The moving walkway can also include digital displays incorporated therein. The digital displays can be located along the sidewalls of the moving walkway. Technically, the digital displays can be on both the interior and exterior of the beltway's sidewalls. However, due to current safety codes and their risk-aversion towards distracting passengers, we will focus the descriptions on just the scenario of exterior displays. The digital displays can be attached modularly to the moving walkway to form a visually continuous canvas along the moving walkway. In one embodiment, the displays can be hidden behind a double-glass window, such that the content appears when the digital displays are turned on, but when powered off only a reflective mirror surface appears. This allows the digital displays to last longer and use less energy, because they can be turned off when activity around the moving walkway is low, but without sacrificing aesthetic appeal. If a portion of the digital display stops working and needs to be repaired, this same concept of double-glass maintains the aesthetic appeal of the system until service repairs are completed.

The dynamic canvas can be made to show numerous types of content, including photographs, animations, videos, films, etc. The content of the digital displays can be of various locations in the city, country, world or universe, of advertisements by local, national or international entities, of artwork by historical artists, current artists, or even artificial intelligence. In one embodiment, the content of the digital displays can be managed via the beltway control system 111, allowing for certain media files to be uploaded, chosen, scheduled and displayed on the system.

In another embodiment, the content of the digital displays can be changed by people physically near the moving walkway, allowing people to choose what content is displayed from a device on or near the moving walkway, with or without the assistance of generative artificial intelligence. The content of the digital displays can also be adapted with the info-gathering devices tracking passengers on the moving walkway to show art, illusions, etc. at points where passengers are traveling—e.g. the canvas could show the bottom half of passengers to be little mermaids, centaurs, etc.

In yet another embodiment of the present disclosure, the present disclosure is directed to an operationally portable moving walkway. An operationally portable moving walkway can be operational without an external power source, or a power source that is not part of the moving walkway. Thus, a moving walkway could be brought in for a function or event and put in place. The portable moving walkway could then be transported to another location to be used. The portable moving walkway may be a single module 101 or be a collection of multiple walkway modules 101. To be portable, the moving walkway includes at least one battery 1403 supported by some part of the moving walkway to be the power source for the moving walkway. In another embodiment, the moving walkway could also have a solar panel to provide the power to the moving walkway when conditions support the use of a solar panel. The moving walkway can include a single battery 1403 or multiple batteries 1403 to power the moving walkway. The battery 1403 or batteries 1403 can be supported by, secured to or attached to any part of the moving walkway such that power is supplied to the moving walkway to operate the moving walkway. In another embodiment, each module 101 of the moving walkway could include its own battery 1403. A battery 1403 stored in one module 101 can provide power to a module 101 that does not include a battery 1403 via a power connection 1405. In a further embodiment, the battery 1403 (or batteries) can be a separate piece of equipment positioned adjacent to the moving walkway or contained in a separate piece of equipment positioned adjacent to the moving walkway.

What is claimed:

1. A moving walkway transit system, the moving walkway transit system comprising:

a moving walkway wherein the moving walkway provides continuous movement of passengers across the moving walkway; and a beltway control system for monitoring and controlling various operational aspects of the moving walkway, the moving walkway having various speed profiles implemented by the beltway control system wherein the beltway control system adjusts the speed profile based upon passenger demographics or volume of passengers using the moving walkway.

2. The moving walkway transit system of claim 1 wherein the moving walkway includes a plurality of walkway modules wherein each walkway module includes a GPS device.

3. The moving walkway transit system of claim 1, wherein the moving walkway includes a plurality of walkway modules and each walkway module operates at the same speed or operates at different speeds.

4. The moving walkway transit system of claim 1 further comprising a digital display supported by a portion of the moving walkway wherein content of the digital display can be managed by the beltway control system.

5. The moving walkway transit system of claim 1 wherein the beltway control system uses data gathering devices to identify emergency situations and initiates safety stops of the moving walkway.

6. The moving walkway transit system of claim 1 wherein the beltway control system tracks and records aspects of the moving walkway via data gathering devices to reduce down time and to schedule maintenance activities.

7. A method of operating and monitoring a moving walkway, the method comprising:

operating and monitoring a moving walkway with a beltway control system wherein the moving walkway provides continuous movement of passengers across the moving walkway, the moving walkway having various speed profiles implemented by the beltway control system wherein the beltway control system adjusts the speed profile based upon passenger demographics or volume of passengers using the moving walkway.

8. The method of claim 7 wherein the moving walkway includes a plurality of walkway modules wherein each walkway module includes a GPS device.

9. The method of claim 7 wherein the moving walkway transit system includes a moving walkway having a plurality of walkway modules and each walkway module operates at the same speed or operates at different speeds.

10. The method of claim 7 wherein the moving walkway transit system further comprises a digital display supported by a portion of the moving walkway wherein content of the digital display can be managed by the beltway control system.

11. The method of claim 7 wherein the beltway control system uses data gathering devices to identify emergency situations and initiates safety stops of the moving walkway.

12. The method of claim 7 wherein the beltway control system tracks and records aspects of the moving walkway transit system via data gathering devices to reduce down time and to schedule maintenance activities.

13. A moving walkway transit system, the moving walkway transit system comprising:

a moving walkway; and a beltway control system for monitoring and controlling various operational aspects of the moving walkway, the moving walkway having various speed profiles implemented by the beltway control system wherein the beltway control system adjusts the speed profile based upon the passenger demographics or volume of passengers approaching the moving walkway.

14. The moving walkway transit system of claim 13 wherein the moving walkway includes a plurality of walkway modules wherein each walkway module includes a GPS device.

15. The moving walkway transit system of claim 13, wherein the moving walkway includes a plurality of walkway modules and each walkway module operates at the same speed or operates at different speeds.

16. The moving walkway transit system of claim 13 further comprising a digital display supported by a portion of the moving walkway wherein content of the digital display can be managed by the beltway control system.

17. The moving walkway transit system of claim 13 wherein the beltway control system uses data gathering devices to identify emergency situations and initiates safety stops of the moving walkway.

18. The moving walkway transit system of claim 13 wherein the beltway control system tracks and records aspects of the moving walkway via data gathering devices to reduce down time and to schedule maintenance activities.

* * * * *